United States Patent Office 3,819,605
Patented June 25, 1974

3,819,605
ANTICOAGULANT ISOLATION FROM PIT VIPER USING A MODIFIED AGAROSE BED AND ELUTING WITH A BENZAMIDINE SOLUTION
William Homer Holleman, Libertyville, and Larry James Weiss, North Chicago, Ill., assignors to Abbott Laboratories, North Chicago, Ill.
No Drawing. Filed Aug. 17, 1973, Ser. No. 389,278
Int. Cl. A61k *17/00*
U.S. Cl. 260—112 R
7 Claims

ABSTRACT OF THE DISCLOSURE

A process for the isolation of the thrombin-like fraction of the venom of the pit viper *Bothrops atrox* (fer-de-lance) is described. The simple process basically consists of placing the clear venom solution on a column containing a specifically modified agarose bed, washing said column, eluting the thrombin-like acting component from said column with an aqueous benzamidine solution and isolating said fraction from said benzamidine solution.

DETAILED DESCRIPTION OF THE INVENTION

For some years it has been known that the venom of *Bothrops atrox* contains a component which is useful as an anticoagulant. More recently, it was discovered that this component actually is a coagulant for blood. In its action, the thrombin-like material to which this invention is directed forms a noncross-linked fibrin polymer which is removed readily by the body's reticulo-endothelial and/ or its fibrinolytic system, thus lowering or depleting the fibrinogen of the blood. It therefore produces an anticoagulant effect.

Unfortunately, the methods for isolating this thrombin-like component known to date leave much to be desired. One of these methods involves a two-stage chromatographic procedure, requiring two columns with different packings and two differently buffered solutions with different requirements for extraction solvents in the two stages. The substrate most commonly used for the first stage of this chromatographic method is diethylaminoethyl cellulose which unfortunately does not produce reliable or easily reproducible results. Worst of all, the so purified venom solution sometimes still contains other venom components which are unacceptable in a pharmaceutical preparation. In another method described more recently, affinity chromatography has been used but yield and quality of the isolated thrombin-like materials are not optimal. In another recent development, the venom solution has been placed on a chromatographic column and is then eluted with a linear gradient salt solution, a method which requires a rather sophisticated apparatus or extensive hand labor.

It is therefore an object of the present invention to provide a simplified one-step process for the production of pure, thrombin-like material from the venom of *Bothrops atrox*. It is a further object of this invention to provide a reproducible process for the isolation of the thrombin-like fraction of *Bothrops atrox* venom. It is another object of this invention to provide an isolation method for the thrombin-like activity from *Bothrops atrox* venom with a high specific activity and in excellent yield. It is a particular object of this invention to provide an improved process for the isolation of the thrombin-like activity from *Bothrops atrox* venom through affinity chromatography using a specified, highly discriminating packing material.

These and other objects are accomplished by placing a clear aqueous solution of the native venom of the *Bothrops atrox* on a column of agarose-diaminodipropylamino-succinyl-*p*-aminobenzamidine containing 1 to 20 micromoles of the diaminodipropylamino-succinyl-*p*-aminobenzamidine chain per ml. of agarose bed volume at a temperature of 0–25° C., washing said column with 0.1–0.7 molar aqueous solution of a water-soluble inorganic salt adjusted to a pH of 7–10 with 0.01–0.5 moles per liter of a buffer and having a maximum ionic strength of 0.8 until the optical density of the wash liquor at 280 nm. goes to $\leqslant 0.2$, eluting said washed column with an aqueous solution of at least 0.08 molar concentration of benzamidine adjusted to a pH of 7–10 with a suitable buffer and separating the protein fraction from said benzamidine eluate. Excellent results are obtained by using gel filtration or dialysis for this separation but there are other suitable methods that allow the separation of the active protein fraction from the benzamidine solution.

In order to produce good reproducibility with the present process and a pure thrombin-like acting material, the bed volume of the above-specified agarose substrate should be at least 15 ml./g. of venom. Bed volumes larger than 30 ml./g. may be used but no additional benefits are derived from such increased volumes. An elution rate of 2 to 20 ml./hr./cm.$^2$ of cross-sectional area is optimal, with the range of 5–10 giving best results from a time/quality standpoint.

The term "native" used in describing the venom in the present description is meant to define a venom which has not been previously treated by other chromatographic or chemical procedures. Consequently, it contains other protein materials, e.g., a thromboplastin-like acting component and/or a cross-linking enzyme. These and other undesirable fractions and components are completely eliminated from the native venom through the present process without an ion exchange pretreatment. On the other hand, it will be understood that the term "native" as defined above does not imply that the venom must be virtually untouched prior to the present one-step separation; it may be centrifuged to eliminate sediments, lyophilized for better storage and stability and, of course, must be dissolved to satisfy the requirements of being applicable as a clear, dilute aqueous solution. If desired, the venom solution may be pretreated with ammonium sulfate to remove certain undesired proteins therefrom. However, such treatments are not necessary as seen below.

While a temperature of 0–25° C. yields reproducible results in the present process, it has been established that by placing the venom on the column at 0–10° C. and eluting the column at that temperature or slightly above, the final yield of the desired material becomes optimal. At temperatures of 10–25° C., a loss of the thrombin-like component is noticed, although the loss is so small that this temperature range is also well suited for this procedure.

The method of the present invention is a very simple and fast procedure for isolating the thrombin-like activity of native venom, producing excellent yields of the desired material and exceptional quality of the product free from fibrin crosslinking factor and thromboplastin-like activity. While the method of this invention is extremely simple in its application, the preparation of the affinity chromatography column is somewhat more extensive but, since this column can be reused almost indefinitely, the more elaborate preparation of the column for this purpose is not seen to be detrimental.

In a general embodiment of the present invention, the properly derivatized agarose is placed in a chromatographic column in the usual fashion and equilibrated with a pyrogen-free, 0.4 molar sodium chloride solution containing a small amount of a buffer to adjust the pH to 7–10. The buffer and the column effluent are checked for identity of both pH and conductivity before equilibration is considered complete. A clear venom solution containing between 20–200 mg./ml. of venom in 0.4 molar sodium chloride and buffered to a pH of 7–10 is then placed on the column. The bed volume of the column should be ½–5 times the volume of the venom solution thus applied. The column is then washed with a sodium chloride solution, adjusted to the same pH as above and having a maximum ionic strength of 0.8 until the optcal density of the wash liquor at 280 nm. ($A_{280}$) is at least 0.1. At this time, elution of the active principle of the venon is started by the application of an aqueous solution having at least a 0.08 molar concentration of benzamidine at a pH of 7–10 to the column and collecting the eluate in small portions for individual assays at 280 nm. for determining the end point of this elution. Most or all of the active and desired component of the venon is eluted when an elution volume equal to the bed volume has been collected.

As seen above, all the solutions applied during the washing, equilibration and elution process require proper buffering. One of the most suitable buffers for this procedure is tris(hydroxymethyl)aminomethane hydrochloride, commonly referred to as TRIS. This buffer is preferred because it is highly acceptable in pharmaceutical preparations due to its extremely low toxicity. However, other buffers commonly used such as sodium citrate, sodium phosphate and others are equally suitable as long as they are soluble in the aqueous salt solutions required in this procedure and stabilize the pH at a given point within the range of 7 and 10. The concentration of the venom solution can be varied within a wide range; while a concentration of 20–200 mg./ml. is suitable, the preferred concentration is between 100–150 mg./ml. At concentrations lower than 20 mg./ml., the volume of the venom solution to be placed on the column becomes excessive for optimal operation of the current process. A concentration higher than 200 mg./ml. is difficult to attain because of the solubility of the venom; obviously, precipitation of any part of the valuable venom must be avoided.

As previously mentioned, the bed volume of the column should be at least 0.5 times the volume of the sample to be placed on the column but may be considerably larger. The venom solution placed on the column should have a volume between 10 and 200% of the bed volume, preferably between 20 and 50%. If the venom volume is substantially less than about 10% of the bed volume, wash and elution times and volumes become excessive for the small amount of venom to be purified. If the bed volume is less than 50% of the volume sample, complete absorption of the active material in the venom is not assured, particularly when the operating temperature is above about 10° C.

The column is usually washed with an aqueous sodium chloride solution at a pH of 7–10, preferably between pH 7.5 and 9 and an ionic strength of no larger than 0.8. A suitable ionic strength for the wash liquor is between 0.1 and 0.7, preferably between 0.3 and 0.5. The benzamidine solution used for eluting the thrombin-like acting material from the column should be of a molar concentration of at least 0.08, preferably 0.1 or higher. Actually, there is no upper limit to this concentration but for practical reasons, a molar concentration of 0.08–2.0 represents the most suitable range. However, when the ionic strength is desired to be >0.08, the excess molarity may be present in the form of other ionizable, inert components such as sodium chloride or buffer. Again the above-mentioned TRIS is an excellent choice.

The collected eluate containing the active thrombin-like component of the venom also contains this buffer and benzamidine. Simple gel filtration through a partially cross-linked dextran gel column or dialysis against any suitable pyrogen-free buffer with an ionic strength of 0.1–1.5 and a pH of 6–9 can be used for a simple and rapid separation of the thrombin-like component from the benzamidine solution. This material is then of extremely high purity and ordinarily represents better than 50%, mostly 60–80% of the thrombin-like component present in the initial venom solution.

In order to illustrate the procedure of the present invention, reference is made to the following example which, however, is meant only as an illustration and is not intended to limit the invention in any fashion.

EXAMPLE

The first step in derivatization procedure is the activation of the agarose. This is done by the procedure of Cuatrecasas et al., Proc. Natl. Acad. Sci., U.S. 61, 636 (1968) except that the pH is maintained at 11.0 for thirty minutes during the activation with CNBr. The agarose used in this process is Sepharose 4B® (a beaded agarose material of a wet bead size of 40–190$\mu$ and having an agarose content of about 4% which excludes proteins of molecular weight above $20 \times 10^6$; marketed by Pharmacia, Ltd. of Uppsala, Sweden). The activated agarose is washed with 4 volumes of cold 0.1 molar ammonium bicarbonate buffer and, as rapidly as possible, 1.3 g. of 3,3'-diaminodipropylamine per 100 ml. of agarose bed volume dissolved in 1 volume of cold, distilled water is added. The pH is brought to 10 with 1 $N$ hydrochloric acid and the mixture is stirred magnetically at 4° C. for 30 minutes with constant pH correction to a range of 9.4–9.5. The mixture is then transferred to a cold lab and stirred at about 6° C. overnight without any further pH correction. The derivatized agarose is then washed with water, pH 3 acetic acid and then thoroughly with water again.

The derivatized agarose is then suspended in 1 volume of cold water and 10 g. of succinic anhydride per 100 ml. of agarose are added over a period of 10 minutes with constant mixing. The temperature is maintained at 5° C. and the pH is adjusted to 6.0 with sodium hydroxide. After 90 minutes, the mixture is washed with water and the procedure is repeated before the final product is thoroughly washed with water again.

The derivatized agarose is now suspended in 1 volume of distilled water and 5 g. per 100 ml. of bed volume of 1-ethyl-3-(3 - dimethylaminopropyl)carbodiimide (EDC) hydrochloride is added. The mixture is then titrated to a pH of 4.75 with 1 molar hydrochloric acid and allowed to react for 15 minutes at room temperature with stirring. For each 100 ml. of agarose bed volume, 1 g. of $p$-aminobenzamidine dissolved in 15 ml. of water, titrated to a pH of 4.75 with sodium hydroxide, is added dropwise to the stirred suspension over a period of 5 minutes. The mixture is then stirred for 5 hours at room temperature while the pH is corrected as required to a level of 4.75 with 1 molar hydrochloric acid. The derivatized agarose is then washed thoroughly with water and then suspended in 1 volume of water. For each 100 ml. bed volume, 2.5 g. of EDC-hydrochloride is added and the pH is adjusted to 4.75. The solution is stirred at room temperature for 15 minutes before adding 0.75 g. of $p$-aminobenzamidine/ 100 ml. bed volume in water at pH 4.75 with stirring. The mixture is allowed to react at room temperature for 1 hour under stirring with the pH being maintained at 4.75. This additional step is repeated once but the mixture is thereby allowed to react overnight at 5–6° C.

A 2.5 x 60 cm. glass column is packed with the above derivatized agarose and equilibrated at 5° C. with a buffer solution containing 0.05 molar TRIS and 0.4 molar sodium chloride, adjusted to pH 9.0 with hydrochloric acid. The buffer and the column effluent are checked for identity of both pH and conductivity before equilibration is considered complete.

A sample of 5 g. of crude *Bothrops atrox* venom is dissolved in 40 ml. of pyrogen-free, 0.4 molar sodium chloride, containing 0.05 molar TRIS hydrochloride and 0.3% (weight by volume) of chlorobutanol; the solution has a pH of 7.3 and is centrifuged at 10,000 g. to remove any insoluble material. The pH of the clear solution is readjusted to 9.0 with sodium hydroxide and is then placed on the column followed by a buffer solution identical to the buffer solution which contains the venom except for the absence of the latter. The flow rate is adjusted to about 60 ml./hr. and the fractions are collected automatically in 8 ml.-portions. The absorption at 280 nm. is read and assayed for fibrinogen clotting activity on alternate fractions. When the optical density at 280 nm. decreases in the collected fractions to 0.2, the thrombin-like activity is specifically eluted from the column with an aqueous solution containing 0.15 molar benzamidine hydrochloride, 0.05 molar TRIS hydrochloride, 0.1 molar sodium chloride and adjusted to a pH of 9.0. The thrombin-like enzymatic activity begins to elute with the benzamidine hydrochloride front and is eluted when a total volume of 100 ml. has passed through. The appropriate fractions are pooled to maximize specific activity and the total units present in the pool are determined. From a comparison between this value and the corresponding value obtained from an aliquot of the crude venom solution, it is determined that 70% of the activity has been retained through this step.

If desired, the pooled eluates are further purified to yield a pharmaceutically acceptable product. This is accomplished by placing this solution on a Sephadex G-100 (a partially cross-linked dextran gel marketed by Pharmacia of Uppsala, Sweden) column (1.9 x 150 cm.) which is equilibrated with a pyrogen-free buffer solution containing 0.02 molar sodium citrate, 0.2 molar sodium chloride and 0.3% (weight per volume) of chlorobutanol at pH 6.0. The flow rate of the column is adjusted to 25 ml./hr. and 6 ml.-fractions are collected automatically. Alternate fractions are read at 280 nm. and assayed as before. The active protein elutes after 1 void volume. Fractions are pooled to maximize specific activity and the pool is assayed, showing a specific activity (NIH-thrombin units per $A_{280}$) of 140 compared to 2.5 for the crude venom, representing a 50-fold purification. The protein appears to be homogeneous on the ultra-centrifuge and gives a $S_{20, w}$ of 2.6. This material appears to be about 90% pure as judged by polyacrylamide disc gel electrophoresis at both pH 9.5 and 4.3.

In a repetition of the above example but using 20° C. as the process temperature, a specific activity of 120 to 130 is obtained with a yield of 60-80% of the initial thrombin-like activity present. By changing the above procedure only as to the buffer, the following results are obtained. At pH 6.0, the specific activity at $A_{280}$ is 45 and the yield is 60 to 75%; at pH 7.3, the specific activity is 60 and the yield is 60-80%.

As will be seen from the above, excellent quality of the thrombin-like component from *Bothrops atrox* can be obtained in a one-step isolation step. This procedure not only produces the desired quality but is advantageous also in producing a high yield, permitting a large volume of venom solution to be processed over a relatively small column and allowing the indefinite reuse of the column.

In this respect, the new procedure is far superior over any previously suggested methods for the isolation of the thrombin-like acting component from a snake venom.

While the above description only mentions sodium chloride as the means to attain a desired ionic strength, it will be obvious to those skilled in the art that other inorganic, water-soluble salts may be used in its place. Such substitutes preferably are neutral, although this is not necessary as the salt solution is adjusted to the required pH by a suitable buffer. Thus, sodium chloride may be replaced by potassium chloride, ammonium chloride, calcium chloride or the corresponding phosphates, sulfates, nitrates, other halides, etc.

What is claimed is:

1. The process of isolating the thrombin-like fraction from the venom of *Bothrops atrox* consisting essentially in placing a clear, aqueous solution of the native venom of said *Bothrops atrox* on a column packed with agarose-diaminodipropylamino-succinyl-p-aminobenzamidine containing 1-20 micromoles of the diaminodipropylamino-succinyl-p-aminobenzamidine chain per ml. of agarose bed volume at a temperature of 0-25° C., washing said column with a 0.1-0.7 molar aqueous inorganic, water-soluble salt solution adjusted to a pH of 7-10 with 0.01-0.5 moles per liter of a buffer and having a maximum ionic strength of 0.8 until the optical density of the wash liquor at 280 nm. decreases to 0.2, eluting said washed column with an aqueous solution of at least 0.08 molar concentration of benzamidine adjusted to a pH of 7-10 with a suitable buffer and separating the protein fraction from said benzamidine eluate.

2. The process of claim 1 wherein said column is packed with at least 15 ml. of said agarose per gram of venom.

3. The process of claim 1 wherein said aqueous venom solution contains between 20 and 200 mg. venom per milliliter of solution volume.

4. The process of claim 1 wherein said temperature is 0-10° C.

5. The process of claim 1 wherein said buffer is tris (hydroxymethyl)aminomethane hydrochloride.

6. The process of claim 1 wherein said inorganic, water-soluble salt solution is a solution of sodium chloride.

7. The process of claim 6 wherein said sodium chloride solution has an ionic strength of 0.3-0.5.

References Cited
UNITED STATES PATENTS 3,743,722   7/1973   Nolan _____ 424—98

HOWARD E. SCHAIN, Primary Examiner

U.S. Cl. X.R.
424—98